(12) United States Patent
Burford

(10) Patent No.: US 7,942,306 B2
(45) Date of Patent: May 17, 2011

(54) FRICTION STIR WELDING TOOL HAVING A COUNTERFLOW PIN CONFIGURATION

(75) Inventor: Dwight A. Burford, Park City, KS (US)

(73) Assignee: Wichita State University, Wichita, KS (US)

( * ) Notice: Subject to any disclaimer, the term of this patent is extended or adjusted under 35 U.S.C. 154(b) by 379 days.

(21) Appl. No.: 11/786,961

(22) Filed: Apr. 13, 2007

(65) Prior Publication Data
US 2008/0251571 A1   Oct. 16, 2008

(51) Int. Cl.
| B23K 13/08 | (2006.01) |
| B23K 15/02 | (2006.01) |
| B23K 1/20 | (2006.01) |
| B23K 20/12 | (2006.01) |
| B23K 31/02 | (2006.01) |
| B23Q 15/00 | (2006.01) |
| B23Q 16/00 | (2006.01) |

(52) U.S. Cl. ............... 228/13; 228/8; 228/9; 228/112.1
(58) Field of Classification Search .................. 228/2.1, 228/8, 9, 13, 73.5, 112.1, 114.5, 119, 566, 228/580; 29/889.2
See application file for complete search history.

(56) References Cited

U.S. PATENT DOCUMENTS

| 5,460,317 A | 10/1995 | Thomas et al. |
| 5,697,544 A | 12/1997 | Wykes |
| 5,718,366 A | 2/1998 | Colligan |
| 5,794,835 A | 8/1998 | Colligan et al. |
| 5,893,507 A | 4/1999 | Ding et al. |
| 6,029,879 A | 2/2000 | Cocks |
| 6,053,391 A | 4/2000 | Heideman et al. |
| 6,138,895 A | 10/2000 | Oelgoetz et al. |
| 6,206,268 B1 * | 3/2001 | Mahoney ............... 228/112.1 |
| 6,227,430 B1 | 5/2001 | Rosen et al. |
| 6,510,975 B2 | 1/2003 | Enomoto |
| 6,676,004 B1 | 1/2004 | Trapp et al. |
| 6,726,084 B2 | 4/2004 | Duncan, Jr. |
| 6,758,382 B1 | 7/2004 | Carter |
| 6,915,939 B2 * | 7/2005 | Hashimoto et al. ........... 228/2.1 |
| 6,994,242 B2 | 2/2006 | Fuller et al. |
| 2001/0004989 A1 | 6/2001 | Ezumi et al. |
| 2004/0035914 A1 | 2/2004 | Hempstead |
| 2004/0060965 A1 * | 4/2004 | Mishra ................ 228/112.1 |
| 2004/0195291 A1 | 10/2004 | Andersson et al. |
| 2005/0001009 A1 | 1/2005 | Raether et al. |

(Continued)

FOREIGN PATENT DOCUMENTS

| WO | WO 93/10935 | 6/1993 |
| WO | WO 95/26254 | 10/1995 |

OTHER PUBLICATIONS

Lynch, "Dealing with multiple start threads on turning centers.(CNC Tech Talk)." Modern Machine Shop. Gardner Publications, Inc. 2006. HighBeam Research. Feb. 1, 2006. <http://www.highbeam.com>.*

(Continued)

Primary Examiner — Jennifer K. Michener
Assistant Examiner — Eli S Mekhlin
(74) Attorney, Agent, or Firm — Alston & Bird LLP

(57) ABSTRACT

A friction stir welding tool having one or more tapered flats for promoting flow of weld material toward the pin terminus and one or more counter-spiraling channels or threads which for promoting flow of the weld material toward the tool shoulder.

26 Claims, 5 Drawing Sheets

U.S. PATENT DOCUMENTS

2005/0121497 A1    6/2005    Fuller et al.
2006/0043151 A1*    3/2006    Stol et al. ........................ 228/2.1

OTHER PUBLICATIONS

Andrews, Tool technology—the heart of friction stir welding, Article, Connect 107 p. 3 (Jul. 2000) http://www.twi.co.uk/j32k/unprotected/band_1/c1073a.html.

Terry Khaled, *An Outsider Looks at Friction Stir Welding*, Fed. Aviation Admin., Report # ANM-112N-05-06, Jul. 2005.

Martin et al., *Friction Stir Lap Welding Methods for Manufacturing Large-Scale Spaceflight Vehicles*, 6th International Symposium on Friction Stir Welding Oct. 10-13, 2006, St. Sauveur, Canada.

* cited by examiner

FRICTION STIR WELDING TOOL HAVING A COUNTERFLOW PIN CONFIGURATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to friction welding and, more specifically, to a tool and method for forming joints between workpieces by friction stir welding.

2. Description of Related Art

The general concept of friction stir welding is generally described in Thomas et al., U.S. Pat. No. 5,460,317; Wykes, U.S. Pat. No. 5,697,544; Colligan, U.S. Pat. No. 5,718,366; Ding et al., U.S. Pat. No. 5,893,507; Heideman et al., U.S. Pat. No. 6,053,391; Oelgoetz et al., U.S. Pat. No. 6,138,895; Rosen et al., U.S. Pat. No. 6,227,430; Colligan, U.S. Pat. No. 6,669,075; Trapp et al., U.S. Pat. No. 6,676,004; Duncan, Jr., U.S. Pat. No. 6,726,084; Carter, U.S. Pat. No. 6,758,382; Ezumi et al., U.S. Published Patent No. 2001/0004989; Andersson et al., U.S. Published Patent No. 2004/0195291; Raether et al., U.S. Published Patent No. 2005/0001009; Fuller et al., U.S. Patent No. 2005/0121497; as well as, "An Outsider Looks at Friction Stir Welding" (Federal Aviation Administration July 2005), all of which are incorporated by reference. Conventional friction stir welding is a solid state process of welding using the frictional heat generated by a non-consumable tool to join workpieces together. The friction stir welding tool includes a pin or probe that is inserted into the joint and a shoulder that is applied against an upper surface of the workpiece. The pin and shoulder rotate to generate friction needed to create a plasticized region along the joint for the welding operation.

In conventional friction stir welding operations, the weld tool often contains one or more geometrical features that promote movement of the weld material down and away from the weld tool shoulder toward the pin terminus.

The present invention relates to the surprising discovery that an improved friction weld may be made using a pin having two geometric features that move the weld material in a first direction toward the pin terminus, and in a second "counterflow" direction toward the shoulder. The first geometric feature comprises one or more tapered flats, while the second geometric feature comprises one or more channels and/or threads oriented in a "counterflow" direction.

BRIEF SUMMARY OF THE INVENTION

The present invention is directed to an improved friction stir welding tool for joining workpieces together. The tool includes a support body rotable about the tool axis. A pin extends from the support body and has a peripheral surface with an angle α relative to the tool axis. The pin contains two geometric features. The first geometric feature moves the weld material away from the shoulder toward the pin terminus. The second geometric feature moves the weld material toward the shoulder in a "counterflow" direction.

In one aspect, the second geometric feature promotes the flow of some material toward the tool shoulder to enhance mixing along the tool pin length, but it does not change the overall net flow of material away from the shoulder. Thus, in one aspect, the first geometric feature promotes a "primary" flow toward the pin terminus, while the second geometric feature promotes a "secondary" counterflow toward the shoulder of the tool.

In another aspect of the present invention, the first geometric feature comprises at least one tapered flat. The tapered flat has a major surface which is angled at an angle θ relative to the tool axis. The angle θ is larger than the angle α of the peripheral surface of the pin.

In another aspect, the first geometric feature comprises a plurality of tapered flats, and each of the tapered flats is angled at an angle θ relative to the tool axis which is larger than the angle α of the peripheral surface of the pin. Each flat may be tapered at the same or different angle.

In still a further aspect, the first geometric feature comprises three tapered flats, and each of the three tapered flats is angled at an angle θ relative to the tool axis which is larger than the angle α of the peripheral surface of the pin. Each of the three flats may be tapered at the same or different angle.

In one aspect, the second geometric feature comprises at least one counter-spiraling channel or thread located between two adjacent tapered flats (or between either side of the same flat if there is only one flat). In one aspect, the counter-spiraling channel preferably does not cross the flat, and wraps around the periphery of the pin opposite the flat.

In still another aspect, the second geometric feature comprises two counter-spiraling channels extending between two or more adjacent tapered flats.

In yet another aspect, the second geometric feature comprises a counter-spiraling single start thread or multiple start thread extending between two or more adjacent tapered flats.

In one aspect, the pin and support body are provided as separate components and so that various support body and pin configurations may be utilized together. In another aspect, the support body and pin are integrally formed.

In another aspect, a method for friction stir welding a workpiece is provided. The method comprises providing a friction stir welding tool comprising a support body rotable about the tool axis. The support body has a shoulder, and a pin extending from the shoulder. The pin has a peripheral surface with an angle α relative to the tool axis. The pin has a first geometric feature on the peripheral surface of the pin comprising at least one tapered flat. The tapered flat is angled at an angle θ relative to the pin axis, and the angle θ is larger than the angle α. The tapered flat is adapted to promote a flow of weld material away from the shoulder when the tool is rotated in a predetermined direction around the tool axis. The second geometric feature on the peripheral surface of the pin comprises at least one counter-spiraling channel or thread. The second geometric feature is adapted to promote a flow of weld material toward the shoulder when the tool is rotated in the predetermined direction around the tool axis. The support body is then rotated around the tool axis in the predetermined direction such that the pin frictionally engages the workpiece to thereby form a friction stir weld joint. The tool may also be used to weld at least two workpieces together at an interface.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be

DETAILED DESCRIPTION OF PREFERRED EMBODIMENT

The present invention is directed to a friction stir welding tool for joining one or more sections of one (e.g., a tube) or more workpieces together or for friction stir processing (mechanically working) the workpiece material in a localized and controlled matter. As used herein, the term "workpiece" is not meant to be limiting, and it is understood that the workpiece can include one or more structural members, which can be configured in various configurations. Typically, the workpieces are configured to create a lap joint or a butt joint. For example, the surfaces of two structural members can be overlapped to form an interface, and the friction stir welding tool can be used to form a weld joint along the interface, thereby joining the structural members. In another embodiment, the workpiece can include a single structural member and the friction stir welding tool can be used to form a weld joint in the member, e.g., to repair a crack, hole, or other defect therein or to affect the material properties of the structural member. Friction stir welding has also been used to prepare T-joints, corner joints, fillet welds, hem joints, and other structural joints, such as a combined (hybrid) lap and butt joint weld used to join a top sheet to the butt joint between two extrusions.

The workpiece may be formed of a variety of materials including, but not limited to, aluminum, aluminum alloys, titanium, titanium alloys, steel, copper, magnesium, magnesium alloys, ferrous alloys, and the like. Non-metal materials can also be welded with the friction stir welding tool, e.g., materials such as polymers and the like. When two or more workpieces are welded together, the materials for each may be the same or different.

The workpieces formed according to the present invention can be used in a variety of applications, including for example, frames, panels, skins, airfoils, and the like for aeronautical and aerospace structures such as aircraft and spacecraft, for marine vehicles, automobiles, and the like, as well as for other applications outside of the transportation industry.

The present invention now will be described more fully hereinafter with reference to the accompanying drawings, in which some but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
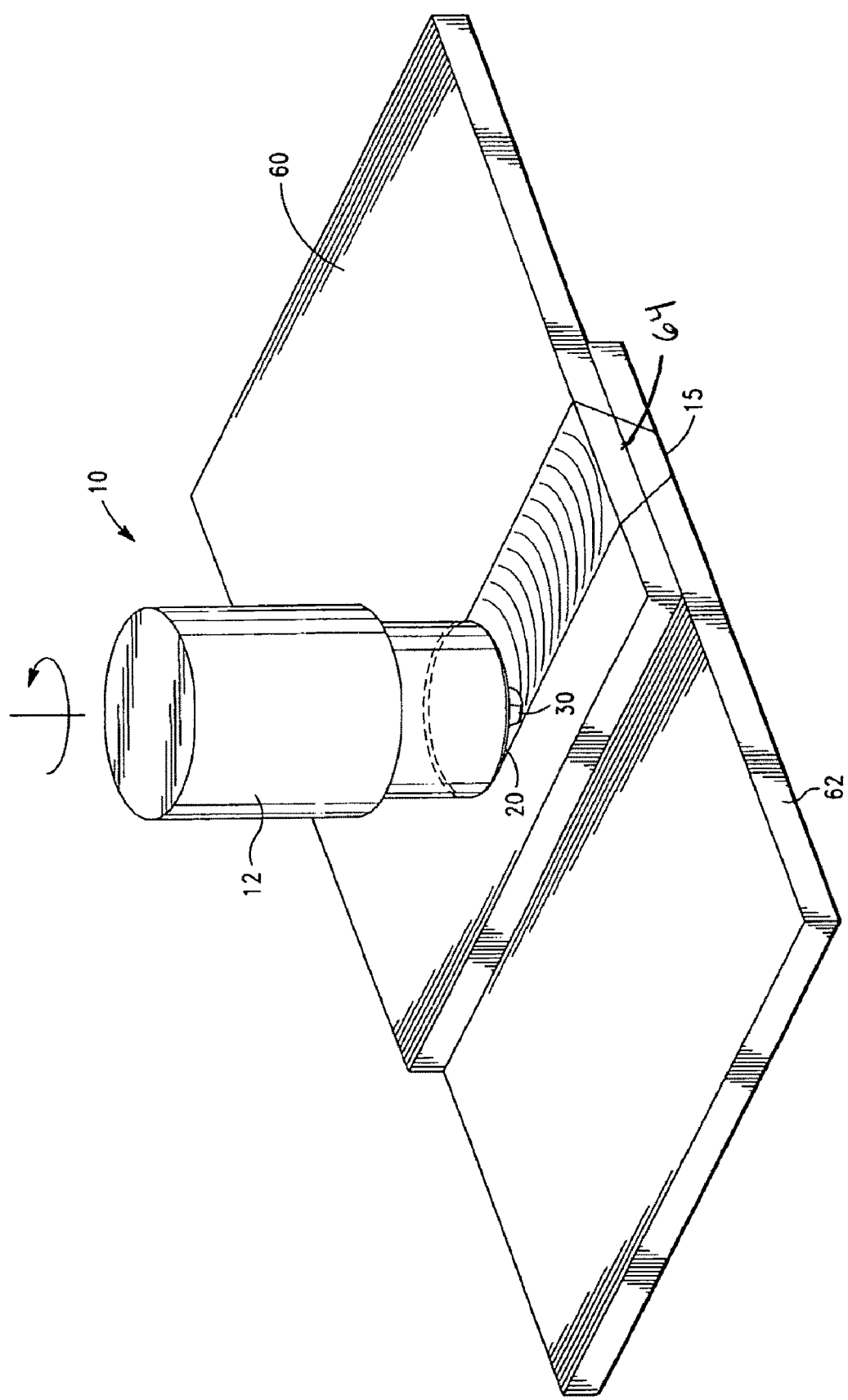
FIG. 1 is a perspective view of a friction stir welding tool in accordance with the present invention, in which two workpieces are welded together to form a lap joint.
Figure 2A:
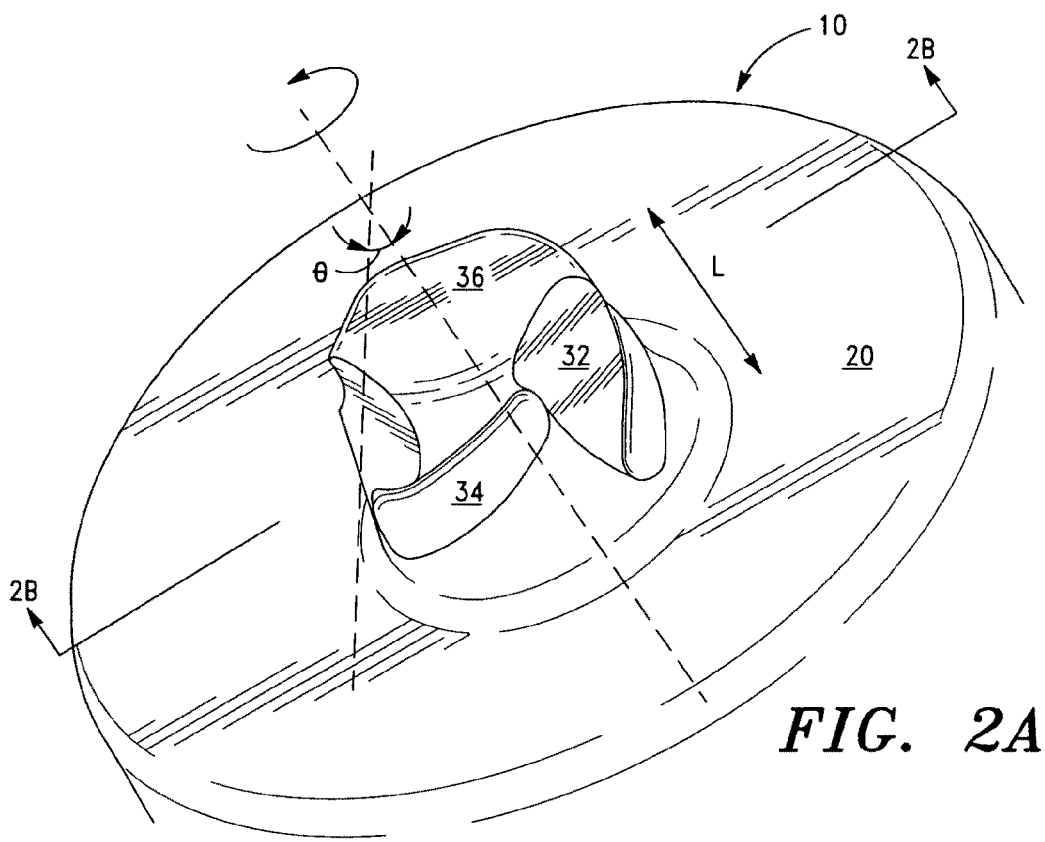
FIG. 2A is a perspective view of the shoulder and pin of a friction stir welding tool in accordance with a first embodiment of the present invention.
Figure 3A:
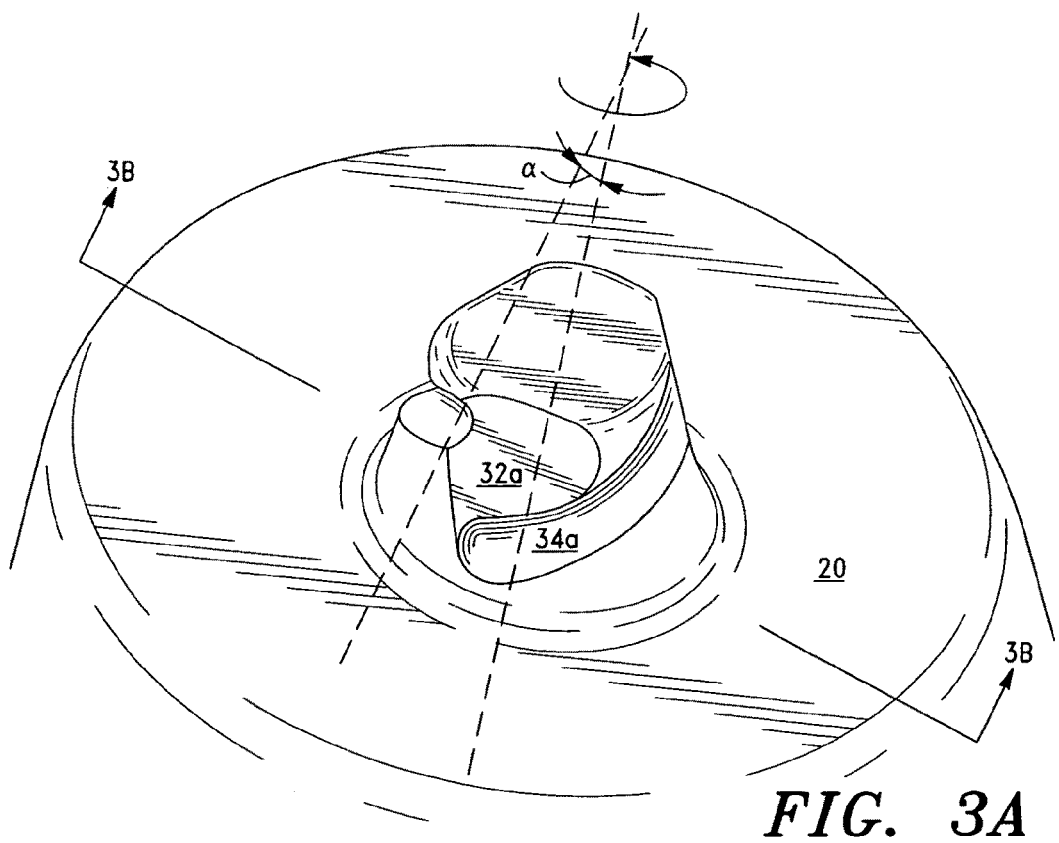
FIG. 3A is another perspective view of the friction stir welding tool shown in FIG. 2.
Figure 2B:
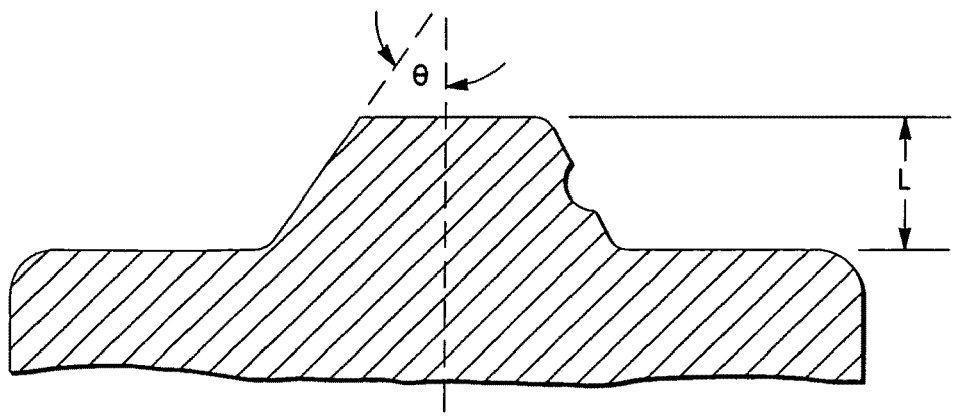
FIG. 2B is a cross-section taken through one of the tapered-flats, illustrating the angle $\theta$ which is steeper than the angle $\alpha$ of the peripheral surface of the pin.

Referring now to the drawings and, in particular, to FIGS. 1, 2, and 3, there is shown a friction stir welding tool 10 according to a first embodiment of the present invention. The tool 10 is used for friction stir welding workpieces 60, 62 together to form a lap joint 15 near the interface 64.

As illustrated in FIG. 1, the friction stir welding tool 10 includes a support body 12 rotable about an axis having a shoulder 20 and a pin 30. Typically, the support body 12 is circular in cross-section, and the pin 30 is centered therein to rotate about the axis. The shoulder 20 and pin 30 are preferably formed of a material having high strength and heat resistance. For purposes of example only and not limitation, the first shoulder 20 and/or pin 30 are constructed of steel, a tungsten alloy, or a nickel alloy and/or cobalt-based alloy.

The shoulder 20 is formed having a configuration to be applied against workpiece 60 to frictionally engage the workpiece 60. Various shoulder configurations are known in the art, such as flat, tapered, convex, concave, and the like. In addition, the shoulder may contain various geometric features, such as a scroll pattern, throughout the surface or a portion thereof such as described in co-pending application Burford, U.S. patent application Ser. No. 11/487,814, which is incorporated by reference in its entirety. Preferably, the scroll pattern on the shoulder terminates prior to the edge or boundary of the shoulder to create a scroll-free concentric surface area.

Various pin 30 configurations may be used in the friction stir welding tools of the present invention. For example, the pin may have an overall configuration or peripheral surface that is cylindrical, conical, frustoconical in shape, and may include a sharp pointed, flat, blunt pointed, radiused, or otherwise rounded terminus. The peripheral surface of the pin may be defined by an angle $\alpha$ relative to the centerline of the weld tool. In the case of a true cylindrical pin, the angle $\alpha$ is 0 degrees because the pin peripheral surface is parallel to the centerline of the tool. In the case of conical pins or similarly shaped pins, the angle $\alpha$ preferably ranges between about 0 and 45 degrees, with an angle $\alpha$ between about 5 and 15 degrees being most preferred.

In the present invention, the pin 30 contains at least two overlapping geometric features. The first geometric feature 32 comprises at least one tapered flat 32a which promotes movement of the weld material away from the shoulder when the tool is rotated. The second geometric feature 34 comprises one or more channels 34a, threads 34b, or combinations thereof, which promote the movement of the weld material toward the shoulder 20 when the tool is rotated. Techniques for machining geometric features in friction stir welding tools are well known to those skilled in the art.

As used herein, the term "flat" encompasses a substantially planar surface on the pin of the friction stir welding tool. The "flat" may be slightly concave or convex (in part due to the manufacture of the pin flats). The flat may contain surface features (e.g., the threads in FIG. 5). The flat is "tapered" in the sense that the flat is angled at an angle θ which is steeper than the angle α of the peripheral surface of the pin as more fully described herein.

As used herein, the term "channel" encompasses grooves, furrows, flutes, tracks, cuts, slots, or other depressions in the pin peripheral surface of the friction stir welding tool.

As used herein, the term "thread" encompasses helical or spiral ridges, ribs, or other protrusions on the pin peripheral surface of the friction stir welding tool.

In the first embodiment, the first geometric feature 32 comprises at least one tapered flat 32a. Typically, the first geometric feature comprises one, two, three, four, five, or six tapered flats. The flats may be spaced equidistantly or at irregular distances around the periphery of the pin. Each of the tapered flats are cut at an angle θ that is steeper than the angle α of the pin peripheral surface, although the angle θ for each tapered flat may be the same or different (e.g. first tapered flat with angle $θ_1$, second tapered flat with angle $θ_2$, third tapered flat with angle $θ_3$, etc., wherein $θ_1$, $θ_2$, $θ_3$ are the same or different). Preferably, the angle θ ranges between about 5 and 40 degrees relative to the centerline of the tool, with angles between about 10 and 20 degrees being most preferred. As the pin is rotated, the tapered flat causes material to be pushed away from the shoulder toward the terminus 36 of the pin 30.

In the first embodiment, the second geometric feature 34 comprises at least one counter-spiraling channel 34a which promotes the flow of material away from the pin terminus 36 and toward the tool shoulder 20. The counter-spiraling channel 34a begins in an overlapping region of the tapered flat 32a and terminates at an overlapping region of an adjacent tapered flat (or begins and terminates the same tapered flat in the case of a tool having only one tapered flat). Typically, the channel 34a begins just above the tool shoulder 20 and terminates near the pin terminus 36, but it will be appreciated that the channel 34a may begin or end anywhere along the pin length L, and need not span the entire length of the pin.

The channels 34a establish a secondary counterflow of material as the pin rotates, which is secondary in terms of amount of material moved along the pin length. The depth and width of the channel may be uniform or non-uniform (i.e., variable), and may be any suitable depth or width. Typical channel dimensions are provided here by way of an example for a pin nominally about 0.085 inches in length and having a base nominally about 0.125 inches in diameter with a pin angle α of about 7 degrees and a tapered flat angle θ of about 16 degrees. For this pin, the channels typically have a depth of about 0.001 up to 0.016 inches, preferably between about 0.05 to 0.012 inches, and even more preferably between about 0.007 to 0.010 inches. The depth of the channels is typically established by the geometry of cutter and the depth to which the cutter is set. For the cutter depths given in this example, and using a radiused cutter, the channels would typically have a width ranging from about 0.016 to 0.055 inches, preferably between about 0.028 to 0.046 inches, and most preferably between about 0.030 to 0.034 inches. The pitch (i.e., radial/axial change per revolution) of the counter-spiraling channel ranges between about 0.15 and 0.30 inches per revolution, and is preferably about 0.20 inches per revolution. These dimensions can typically be scaled for pins of different lengths and diameters, but in all cases, the pin features should be tested and "tuned" for optimum material flow.

Figure 3B:
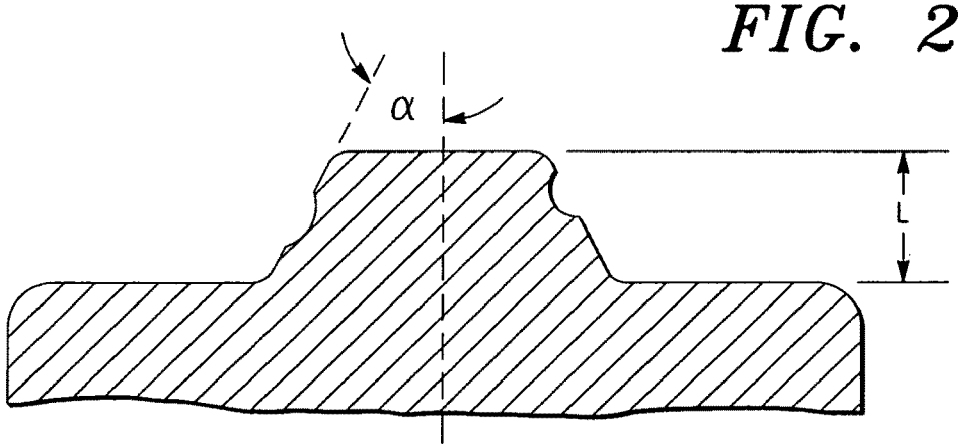
FIG. 3B is a cross-section taken through one of the tapered-flats, illustrating the angle $\alpha$ of the peripheral surface of the pin.

FIGS. 2A, 2B, 3A, and 3B illustrate a pin of a friction stir welding tool in accordance with the first embodiment. The first geometric feature 32 comprises three tapered flats 32a spaced equidistantly around the periphery of the pin 30. Each tapered flat has an angle θ of about 16 degrees relative to the centerline or axis of the tool (FIG. 2B), while the peripheral surface (the remainder of which is untapered) of the pin has an angle α relative to the centerline of the weld tool (FIG. 3B). The second geometric feature comprises three counterflow channels 34a which are spiraled between each of the three tapered flats 32a. Each counterflow channel 34a begins in a tapered flat 32a just above the tool shoulder 20 and terminates in an adjacent tapered flat near the pin terminus 36.

As the tool 10 is urged against and into a workpiece and is rotated in a counter-clockwise direction as viewed looking toward the face of the tool shoulder (or clockwise when looking down on the surface of the workpiece along the axis of the tool) according to the arrow shown in the figures, the tapered flats 32a promote movement of the weld material away from the tool shoulder 20 while the counter-spiraling channels 34a promote movement of the weld material toward tool shoulder. Such counter-movement is theorized (and confirmed by comparing FIG. 6 and FIG. 7) to be effective in breaking up the faying surface during the friction stir welding process.

Figure 4:
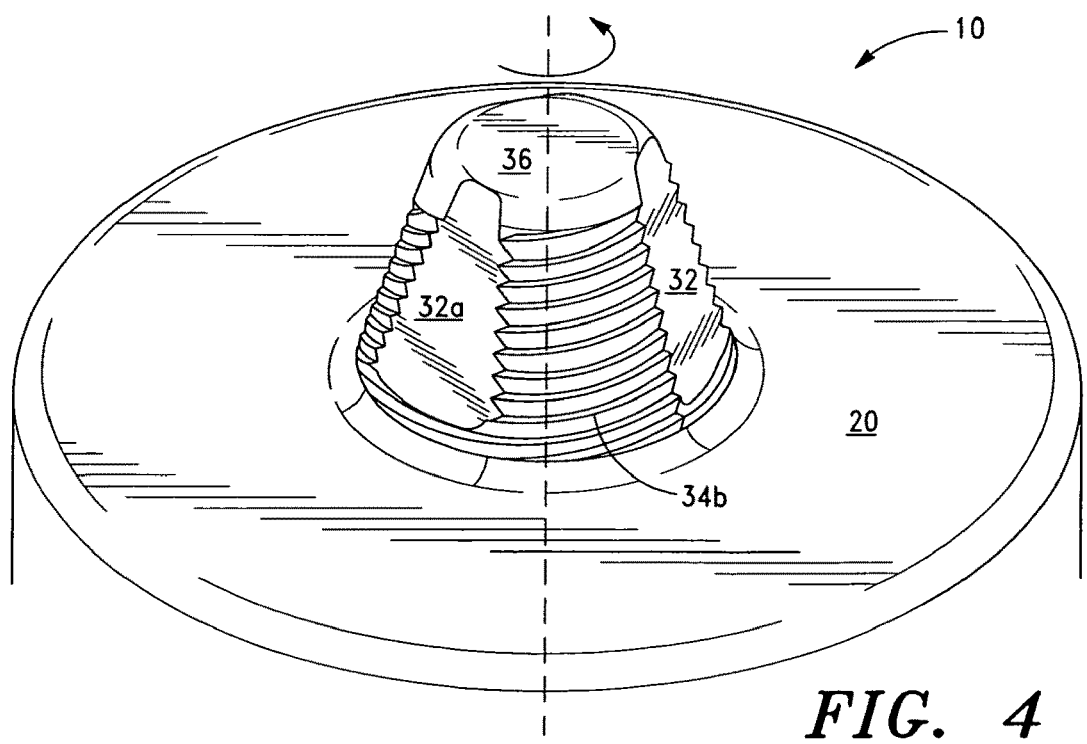
FIG. 4 is a perspective view of the friction stir welding tool in accordance with a second embodiment of the present invention.

In a second embodiment, as shown in FIG. 4, the first geometric feature 32 comprises at least one tapered flat 32a as discussed above. In the second embodiment, however, the second geometric feature comprises counter-spiraling threads 34b which promote the flow of material away from the pin terminus 36 and toward the tool shoulder 20. For example, the second geometric feature may comprise a left-handed thread which promotes the flow of material toward the shoulder when the tool is rotated in a counter-clockwise direction (when viewing the surface of the workpiece along the axis of the tool). Alternatively, the second geometric feature may be a right-handed thread which promotes the flow of material toward the shoulder when the tool is rotated in a clockwise direction (when viewing the surface of the workpiece along the axis of the tool).

Various thread types are known in the art and are suitable for forming the threads 34b. Examples include those with a standard coarse or fine screw thread profile as well as buttress, stub acme, acme, ball full radius, ball offset radius, and isometric trapezoidal profile, worm, etc . . . . Typical thread dimensions are provided here by way of an example for a standard profile on a pin nominally 0.085 inches in length and having a base nominally 0.125 inches in diameter with a pin angle α of about 7 degrees and a tapered flat angle θ of about 16 degrees. For a screw thread profile, the thread depth (the distance between the crest and the root of a thread) is preferably about 0.87 divided by the number of threads per inch, but may be truncated (shortened). The thread pitch (the distance from a point on one thread to a corresponding point on the next thread) is preferably between about 0.021 to 0.042 inches. The thread angle (the angle formed by the two sides of the thread, or their projections, with each other) is nominally 60 degrees. The threads of the second geometric feature need not be uniform throughout and may be cut to the same or different depth, pitch, angle, and profile. In addition, the threads may be single start or multiple start threads.

FIG. 4 illustrates a pin of a friction stir welding tool in accordance with the second embodiment. The first geometric feature 32 comprises three tapered flats 32a spaced equidistantly around the periphery of the pin 30. Each tapered flat has an angle θ of about 16 degrees relative to the centerline or axis of the tool. The second geometric feature comprises counterflow threads 34b between each of the three tapered flats 32a. Each counterflow thread 34b begins in a tapered flat just above the tool shoulder 20 and terminates in an adjacent tapered flat near the pin terminus 36.

As the tool 10 is urged against and into a workpiece and is rotated in a counter-clockwise direction when viewing the shoulder surface of the workpiece along the axis of the tool according to arrow, the tapered flats 32a promote movement of the weld material away from the tool shoulder 20 while the threads 34b promote movement of the weld material toward tool shoulder. Such movement is theorized to be effective in breaking up a faying surface during the friction stir welding process.

In a third embodiment (not shown), the second geometric feature comprises a combination of counter-spiraling channels or threads. That is, the pin has a first geometric feature comprising at least one tapered flat 32a (e.g., three tapered flats) that promotes movement of the material away from the pin terminus 30 and toward the tool shoulder 20. The second geometric feature comprises a combination of counter-spiraling channels 34a and threads 34b. The counter-spiraling channels 34a and threads 34b are both oriented in the same counter-spiraling direction in order to promote movement of the weld material toward the shoulder during use.

Figure 5:
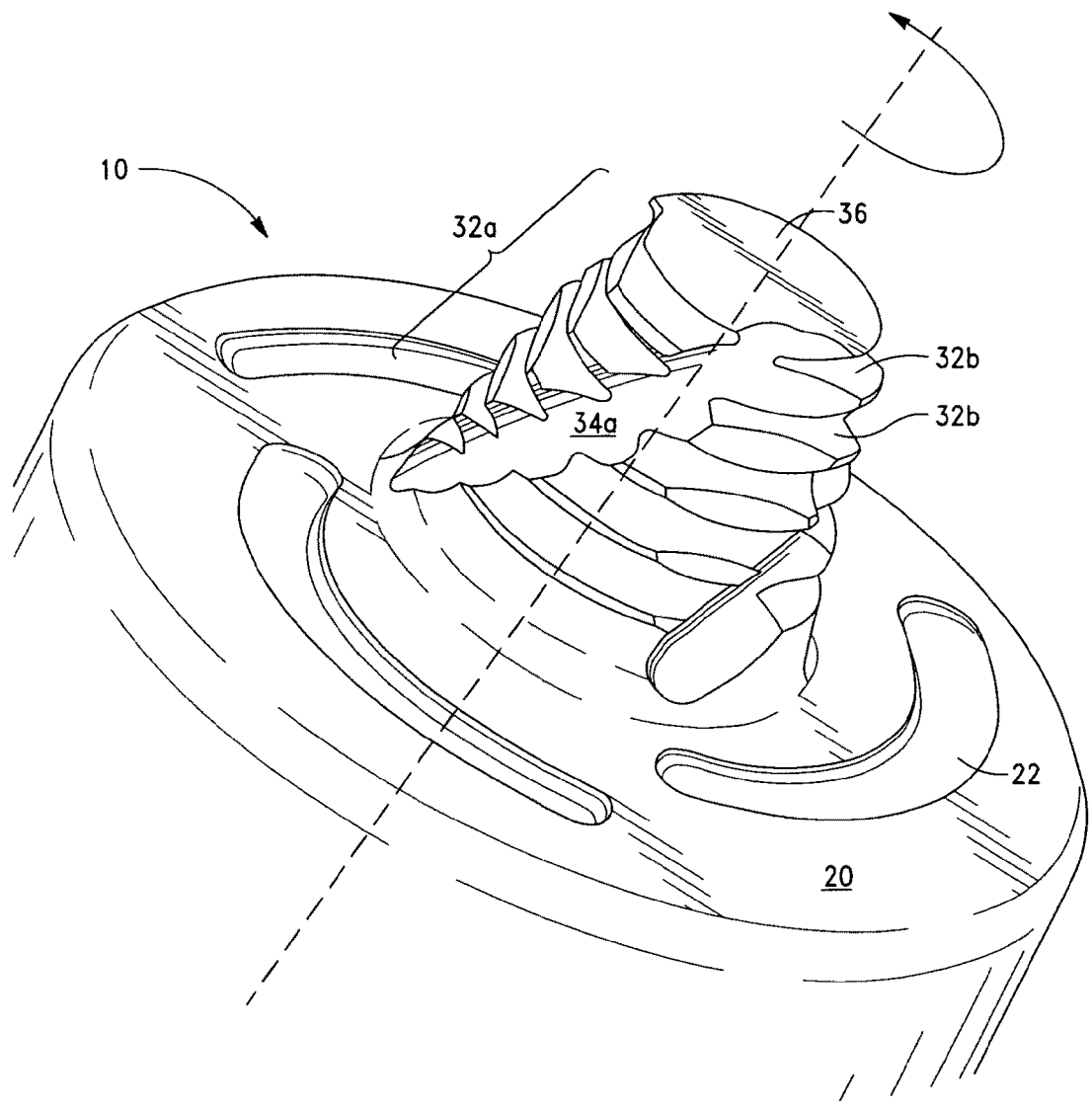
FIG. 5 is a perspective view of the friction stir welding tool in accordance with a second embodiment of the present invention.

FIG. 5 illustrates a pin of a friction stir welding tool in accordance with a fourth embodiment. The fourth embodiment is similar to the first embodiment except that the fourth embodiment further comprises a set of threads 32b oriented to cause material to be pushed away from the shoulder toward the terminus 36 of the pin. Thus, in an exemplary aspect, the first geometric feature 32 comprises three tapered flats 32a spaced equidistantly around the periphery of the pin 30. Each tapered flat has an angle θ of about 16 degrees relative to the centerline or axis of the tool. The second geometric feature comprises counter-spiraling channel 34a between each of the three tapered flats 32a. In addition, the tool includes forward-spiraling or syn-spiraling threads 36 (i.e., that operate in conjunction with the tapered flats). As the tool 10 is urged against and into a workpiece and is rotated in a counter-clockwise direction as viewed looking toward the face of the tool shoulder (or clockwise when looking down on the surface of the workpiece along the axis of the tool) according to the arrow shown in the FIG. 5, the tapered flats 32a and the forward-spiraling threads 32b promote movement of the weld material away from the tool shoulder 20 while the counter-spiraling channels 34a promote movement of the weld material toward the tool shoulder.

In addition, as illustrated in FIG. 5, the shoulder 20 contains yet another geometric feature. In this instance, a scroll pattern 22 is provided throughout the surface or a portion thereof such as described in co-pending application Burford, U.S. patent application Ser. No. 11/487,814, which is incorporated by reference in its entirety. Exemplary scroll patterns include single or multiple logarithmic spirals, Archimedean spirals, Golden Section spirals, wobbly spirals, concentric grooves, and the like. Preferably, the scroll pattern on the shoulder terminates prior to the edge or boundary of the shoulder 20 to create a scroll-free concentric surface area.

In each of the foregoing embodiments, the geometric features were illustrated spaced in a symmetrical fashion around the periphery of the pin. It will be appreciated to those skilled in the art that these features may alternatively be spaced in an irregular manner. For example, one-half of the pin may contain two flats, while the other half may contain one flat. As another example, there may be one counterflow channel in one region of the pin, while two or more counterflow channels may be in other regions of the pin. In yet another example, another region of the same pin may have counterflow threads.

From the foregoing, it will be seen that this invention is one well adapted to attain all ends and objectives herein above set forth, together with the other advantages which are obvious and which are inherent to the invention.

EXAMPLE 1

Comparison of Welds

In this example, a conventional friction stir welding tool having three tapered flats extending along the pin was compared to a tool in accordance with the present invention in having three tapered flats combined with three counter-spiraling channels.

More specifically, the tool comprised a support body with a concave shoulder having a diameter of about 0.375 inches. The pin extended out from the shoulder at about a 7 degree angle (α) from the centerline of the tool. The pin was about 0.085 inches long and had a radius of about 0.124 inches at the pin base near the shoulder.

The conventional friction stir welding pin had three tapered flats extending from the base of the pin to its terminus. The flats were tapered at an angle (θ) steeper than the angle (α) of the pin, namely about 16 degrees from the centerline of the tool. The flats were spaced equidistantly around the periphery of the pin, i.e., about 120 degrees apart.

The inventive friction stir welding pin also had three channels. Each channel was positioned between two tapered adjacent flats. Each channel started near the base of the pin adjacent to the shoulder in a tapered flat (about 0.125 inches from the end of the pin) and terminated in an adjacent tapered flat at the pin terminus. The channels had an axial pitch of 0.2 inches per revolution, and were about 0.04 inches in wide and about 0.007 inches deep. Each groove was positioned equidistantly around the periphery of the pin.

Figure 6:
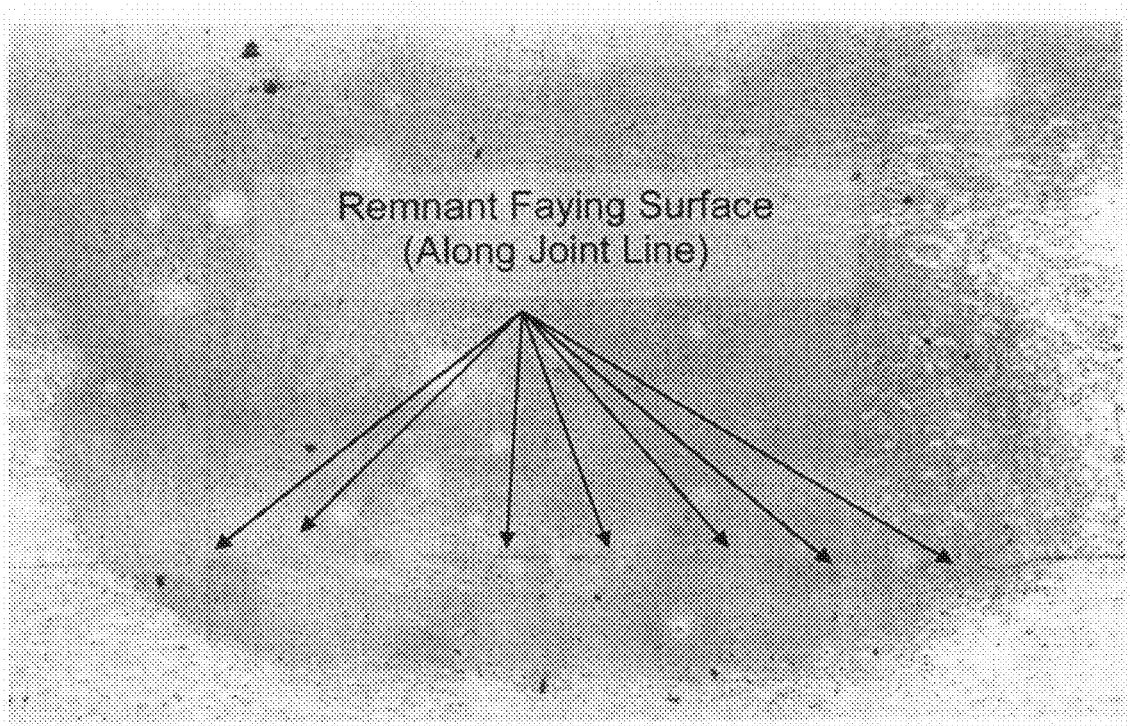
FIG. 6 is a micrograph showing a cross-section of a weld joint made using a conventional friction stir welding tool having three tapered or beveled flats and no counter-spiraling channels. A remnant faying surface defect was produced. The aluminum alloy 7075 samples were etched with Kellers etch and the photographs are magnified 37.5 times.
Figure 7:
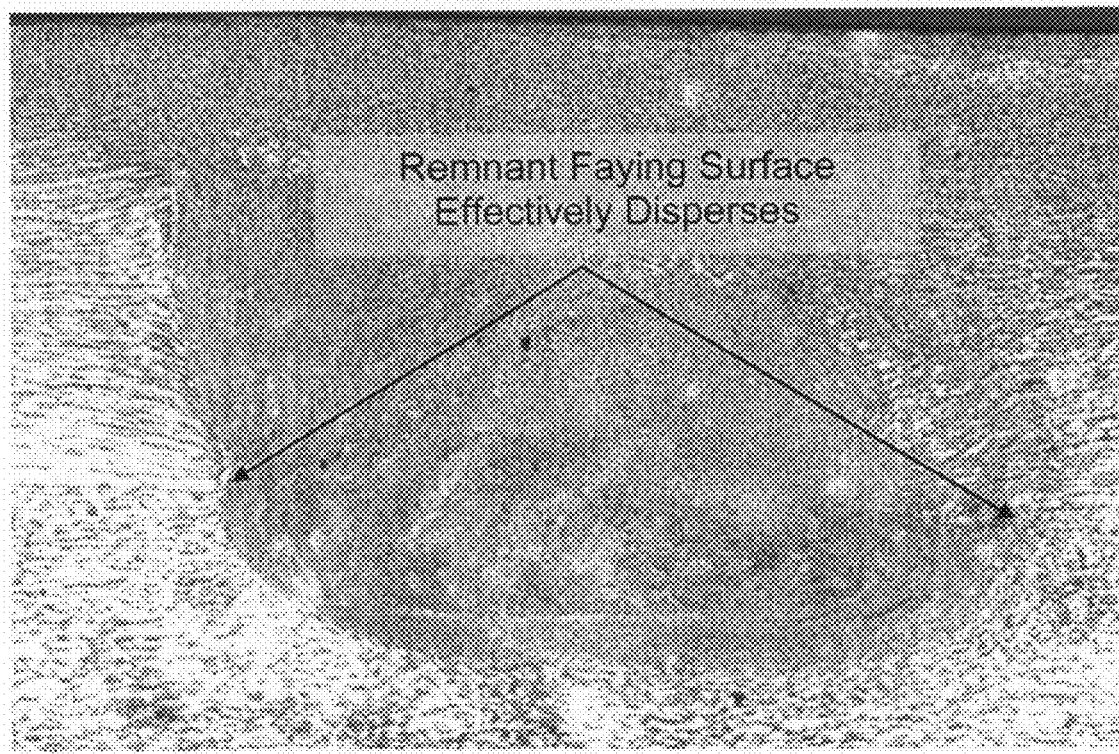
FIG. 7 is a micrograph showing a cross-section of a weld joint made using an inventive friction stir welding tool having three tapered or beveled flats and three counter-spiraling channels. The remnant faying surface defect was successfully dispersed with the inventive tool.

FIGS. 6 and 7 illustrate the weld tracks for the comparative and inventive tool. The welds were run at a spindle speed of 1550 rpm and a tool travel speed of 20 inches per minute at the same forge force. As shown in the figures, the weld track made using the conventional tool (FIG. 6) revealed a number of surface defects along the joint line. In contrast, the weld track made using the inventive tool (FIG. 7) dispersed the faying surface artifact.

In addition, mechanical bend testing was performed by hand and a qualitative assessment was made as to whether the weld failed along the bond line or did it fail through the thickness. The sample in FIG. 6 failed along the bond line while the sample in FIG. 7 failed through the sheet thickness when bent to failure.

Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A tool for forming a friction stir weld joint in a workpiece, the tool comprising:
a support body rotable about a first axis, the support body having a shoulder;
a pin extending from said shoulder, said pin having a peripheral surface with an angle α relative to said first axis;
a first geometric feature on said peripheral surface of said pin comprising a plurality of tapered flats, wherein each of said plurality of tapered flats is angled at an angle relative to said first axis, said angle of each of said plurality of tapered flats being larger than said angle α, and wherein said plurality of tapered flats is adapted to promote a flow of weld material away from said shoulder;
a second geometric feature on said peripheral surface of said pin comprising at least one counter-spiraling channel or thread on said pin's peripheral surface, said second geometric feature adapted to promote a flow of weld material toward said shoulder, and said second geometric feature overlapping with said first geometric feature such that said second geometric feature and said first geometric feature overlap by different amounts on different sections of said peripheral surface along a length of said pin.

2. The tool of claim 1 wherein each of said plurality of tapered flats is angled at an angle θ relative to said first axis, said angle θ being larger than said angle α.

3. The tool of claim 1 wherein said plurality of tapered flats are angled at a respective plurality of different angles relative to said first axis, said angles of said tapered flats each being larger than said angle α of said peripheral surface of said pin.

4. The tool of claim 1 wherein said second geometric feature comprises at least one counter-spiraling channel.

5. The tool of claim 4 wherein said counter-spiraling channel has a uniform width and uniform depth.

6. The tool of claim 1 wherein said second geometric feature comprises at least one counter-spiraling channel between two adjacent flats in said plurality of tapered flats.

7. The tool of claim 1 wherein said plurality of tapered flats comprises at least three tapered flats, and wherein said second geometric feature comprises at least one counter-spiraling channel between each tapered flat.

8. The tool of claim 7 wherein said second geometric feature comprises two counter-spiraling channels extending between two adjacent flats.

9. The tool of claim 1 wherein said second geometric feature comprises a counter-spiraling single start thread.

10. The tool of claim 1 wherein said second geometric feature comprises a counter-spiraling multiple start thread.

11. The tool of claim 1 wherein said plurality of tapered flats comprises at least three tapered flats, and wherein said second geometric feature comprises at least one counter-spiraling thread between each tapered flat.

12. The tool of claim 1 wherein said pin and support body are integrally formed.

13. The tool of claim 1 further comprising a scroll pattern on said shoulder of said tool.

14. The tool of claim 13 wherein said scroll pattern terminates prior to an edge of said shoulder to create a scroll-free concentric surface area.

15. The tool of claim 1 wherein said tool is for forming a lap joint.

16. The tool of claim 1 wherein said second geometric feature overlaps with said first geometric feature to promote, at an area of the workpiece, an alternating flow of a first amount of weld material away from said shoulder and a second, lesser amount of weld material toward said shoulder as the tool rotates in engagement with the respective area of the workpiece.

17. A tool for forming a friction stir weld joint in a workpiece, the tool comprising:
a support body rotable about a first axis, the support body having a shoulder;
a pin extending from said shoulder, said pin having a peripheral surface;
a first geometric feature on said peripheral surface of said pin comprising a plurality of tapered flats or a set of threads, said first feature adapted to promote a flow of weld material away from said shoulder when the tool is rotated in a predetermined direction around said axis; and
a second geometric feature on said peripheral surface of said pin, said second geometric feature adapted to promote a flow of weld material toward said shoulder when said tool is rotated in said predetermined direction, but said second geometric feature does not change the net flow of material away from said shoulder, and wherein said second geometric feature overlaps with said first geometric feature such that said second geometric feature and said first geometric feature overlap by different amounts on different sections of said peripheral surface along a length of said pin.

18. The tool of claim 17 wherein said second geometric feature overlaps with said first geometric feature to promote, at an area of the workpiece, an alternating flow of a first amount of weld material away from said shoulder and a second, lesser amount of weld material toward said shoulder as the tool rotates in engagement with the respective area of the workpiece.

19. The tool of claim 17 wherein said second geometric feature comprises at least one counter-spiraling channel.

20. The tool of claim 17 wherein said second geometric feature comprises at least one counter-spiraling channel between two adjacent flats in said plurality of flats.

21. The tool of claim 17 further comprising a scroll pattern on said shoulder of said tool, said scroll pattern terminating prior to an edge of said shoulder to create a scroll-free concentric surface area.

22. The tool of claim 17 wherein said pin having a peripheral surface with an angle α relative to said first axis, and said first geometric feature comprising a plurality of tapered flats, wherein each of said plurality of tapered flats is angled at an angle relative to said first axis, said angle of each of said plurality of tapered flats being larger than said angle α.

23. The tool of claim 22 wherein each of said plurality of tapered flats is angled at an angle θ relative to said first axis, said angle θ being larger than said angle α.

24. The tool of claim 22 wherein said plurality of tapered flats are angled at a respective plurality of different angles relative to said first axis, said angles of said tapered flats each being larger than said angle α of said peripheral surface of said pin.

25. The tool of claim 22 wherein said plurality of tapered flats comprises at least three tapered flats, and wherein said second geometric feature comprises at least one counter-spiraling channel or thread between each tapered flat.

26. The tool of claim 25 wherein said second geometric feature comprises two counter-spiraling channels extending between two adjacent flats.

* * * * *